US011379334B1

(12) United States Patent
Srinivasan et al.

(10) Patent No.: US 11,379,334 B1
(45) Date of Patent: Jul. 5, 2022

(54) NETWORK DEVICE HAVING DYNAMIC PORT OR LINK STATUS INDICATORS

(71) Applicant: Juniper Networks, Inc., Sunnyvale, CA (US)

(72) Inventors: Eswaran Srinivasan, Fremont, CA (US); Vineet Sharma, Mullanpur (IN); Sumeet Mundra, Bagalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/248,365

(22) Filed: Jan. 21, 2021

(51) Int. Cl.
| | | |
|---|---|---|
| G06F 11/32 | (2006.01) | |
| H04L 43/0811 | (2022.01) | |
| H04L 49/351 | (2022.01) | |
| H04L 49/40 | (2022.01) | |
| H04L 41/0873 | (2022.01) | |
| H04L 41/0816 | (2022.01) | |
| H04L 41/0686 | (2022.01) | |
| H04L 41/0806 | (2022.01) | |

(52) U.S. Cl.
CPC .......... *G06F 11/325* (2013.01); *G06F 11/326* (2013.01); *H04L 43/0811* (2013.01); *H04L 49/351* (2013.01); *H04L 49/40* (2013.01); *H04L 41/0686* (2013.01); *H04L 41/0806* (2013.01); *H04L 41/0816* (2013.01); *H04L 41/0873* (2013.01)

(58) Field of Classification Search
CPC ... H04L 43/0805; H04L 49/351; H04L 49/40; H04L 43/0811; G06F 11/325; G06F 11/326; G06F 11/3041; G06F 11/3044
USPC ...................................... 340/815.45
See application file for complete search history.

(56) References Cited

U.S. PATENT DOCUMENTS

| | | | | |
|---|---|---|---|---|
| 7,586,407 | B2 * | 9/2009 | Huang | ............... H04L 41/0681 340/525 |
| 8,291,266 | B2 * | 10/2012 | Windell | ............... G06F 11/325 714/46 |
| 8,421,647 | B2 | 4/2013 | Kobraei et al. | |
| 9,912,556 | B1 | 3/2018 | Hendin et al. | |
| 10,264,332 | B1 * | 4/2019 | Sable | ..................... H04L 43/045 |
| 2008/0030362 | A1 | 2/2008 | Huang et al. | |
| 2016/0378630 | A1 * | 12/2016 | Narayanan | .......... G06F 11/3041 710/18 |
| 2019/0027001 | A1 * | 1/2019 | Sebastian | ................. G08B 5/36 |

* cited by examiner

*Primary Examiner* — Gregory G Todd
(74) *Attorney, Agent, or Firm* — Shumaker & Sieffert, P.A.

(57) ABSTRACT

An example network device includes a plurality of network ports that each facilitate one or more network links between the network device and one or more remote devices, a plurality of indicators each configured to represent a status of a respective one of the plurality of network ports on the network device, and processing circuitry configured to reconfigure at least one of the plurality of indicators to represent a link-status of the one or more network links of at least one network port of the network device in response to a command.

16 Claims, 9 Drawing Sheets

NETWORK DEVICE HAVING DYNAMIC PORT OR LINK STATUS INDICATORS

TECHNICAL FIELD

The disclosure relates to computer networks and, more specifically, to routers.

BACKGROUND

A network device may include a plurality of network ports (e.g., several dozen), each of which may facilitate multiple network links (alternatively referred to as lanes or channels) via the use of multi-link transceivers. Many network devices may indicate the health or status of each port and each link within each port using visual status indicators corresponding to each port and link. For example, a conventional network device may indicate the status of its network ports via a first array of light emitting diodes (LEDs) that each indicate the health and/or status of each port and a second array of LEDs that each indicate the health and/or status of each network link of a port. Users may determine whether a particular network link of a particular network port on the device is functional or broken based on the current state (e.g., color) of the corresponding LED.

SUMMARY

In general, network devices and techniques for displaying the health/status of a plurality of network links over a plurality of channels within each of a plurality of ports with a reduced set of dedicated link-status indicators, or without dedicated link-status indicators, is disclosed.

In one example, this disclosure describes a network device including a plurality of network ports that each facilitate one or more network links between the network device and one or more remote devices; a plurality of indicators each configured to represent a status of a respective one of the plurality of network ports on the network device; and processing circuitry configured to reconfigure at least one of the plurality of indicators to represent a link-status of the one or more network links of at least one network port of the network device in response to a command.

In another example, this disclosure describes a method of operating a network device including configuring, via processing circuitry, a plurality of indicators to represent a status of a respective one of a plurality of network ports, wherein each network port of the plurality, of network ports facilitates one or more network links between a network device and one or more remote devices; receiving, by the processing circuitry, a command to reconfigure one or more of the plurality of indicators; and reconfiguring, via the processing circuitry, the one or more of the plurality of indicators to represent a link-status of the one or more network links of at least one network port of the network device in response to the command.

In another example, this disclosure describes a network device including a plurality of network ports that each facilitate one or more network links between the network device and one or more remote devices; a plurality of port-status indicators that each represent a status of one of the plurality of network ports on the network device; one or more link-status indicators configured to represent a link-status of one or more of the network links of the network ports; and processing circuitry configured to reconfigure to the one or more link-status indicators to represent a link-status of another of the one or more network links of the network ports in response to a command The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

As the number of links that a multi-port, multi-link network device may support grows, the physical enclosure of the network device may be unable to house a sufficient number of both dedicated port-status indicators and dedicated link-status indicators to represent each individual network link. As such, techniques for dynamically reconfiguring indicators to represent a port-status or a link-status may be desirable.

The network devices and techniques of this disclosure may provide one or more advantages. For example, the network devices and techniques of this disclosure provide for visual (and/or audible) indication of the link-status of multi-link network devices with reduced, or without, dedicated link-status indicators and/or without space for a full complement of dedicated link-status indicators. Providing such visual indication of the link-status of individual links reduces the time and complexity of commissioning and/or troubleshooting links, e.g., at least because a user may readily and visually (and/or audibly) determine whether a link is function, broken, or connecting/linking without necessarily executing one or more commands, e.g., a command line interface (CLI) or virtual terminal line (VTY) command. The network devices and techniques disclosed may also reduce the complexity and space constraints of network device hardware design, e.g., by reducing and/or eliminating space and/or hardware supporting the functionality of dedicated link-status indicators.

Figure 1:
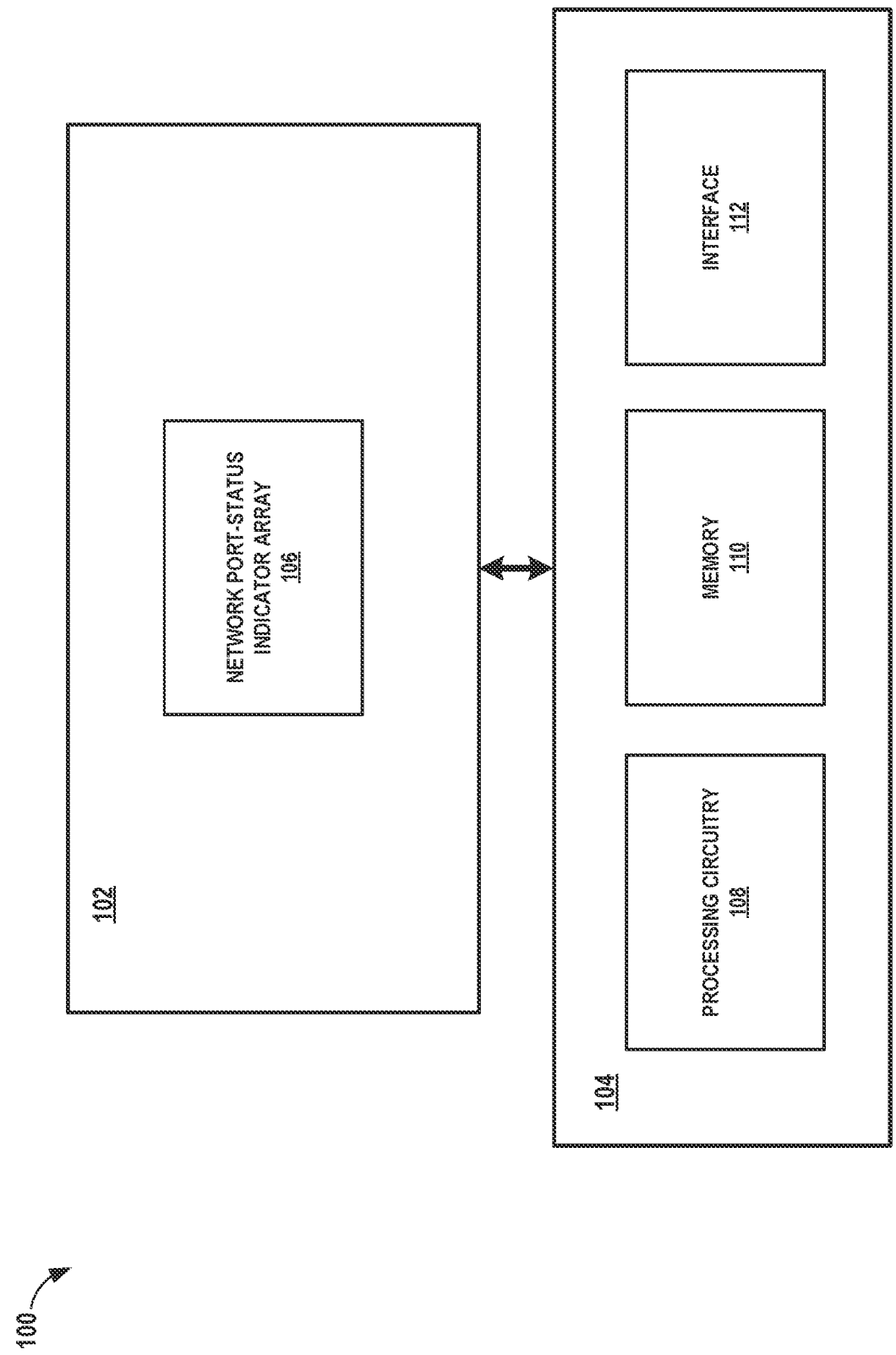
FIG. 1 is a block diagram illustrating an example network device including network ports and network port-status indicators, in accordance with techniques described in this disclosure.

FIG. 1 is a block diagram illustrating an example network device 100 including network ports and network port-status indicators, in accordance with techniques described in this disclosure. In the example shown, network device 100 includes panel 102 and computing device 104.

In some examples, network device 100 may include and/or represent any hardware and/or software component of a network device that may indicate the status, health, and/or operational mode of one or more network links facilitated by the network device. The term "network device," as used herein, generally refers to any computing device capable of routing network traffic (e.g., optical signals, network packets, wireless signals, and/or wired signals) to and/or from one or more other devices. Examples of network devices include, but are not limited to, optical transceivers, routers, switches, hubs, modems, bridges, repeaters, gateways, load balancers, multiplexer, network adapters, servers, client devices, portions of one or more of the same, variations or combinations of one or more of the same, and/or any other suitable network device.

In some examples, network device 100 may facilitate network traffic via one or more network ports (not shown in FIG. 1) on the network device. The term "network port," as used herein, generally refers to any communication endpoint on a network device. For example, a network port may represent a physical outlet and/or interface by which a network device may transfer network traffic via one or more cables, wires, etc. Additionally or alternatively, a network port may represent a software-defined construct and/or destination. Network device 100 may include any number of network ports (e.g., 16 network ports, 24 network ports, etc.).

In some examples, a network port may facilitate or operate one or more network links. The term "network link," as used herein, generally refers to any individual communication channel and/or lane that is operational within, through, and/or by way of a network port. In some examples, a network port may send and/or receive multiple instances of the same data or signal through multiple network links that connect the network port to various remote devices (e.g., via breakout cables). A network port may facilitate any number of network links (e.g., 1, 2, 3, 4, 8, etc., network links). In one example, each network port included on a network device may facilitate the same number of network links (e.g., each network port on network device 100 may facilitate one 10 Gigabit Ethernet (GbE) network link). In other examples, network device 100 may include network ports that facilitate varying numbers of network links, e.g., network device 100 may include network ports that facilitate four 10 GbE network links, network ports that facilitate one 40 GbE network link, and network ports that facilitate any number of network links at any speed.

Panel 102 generally represents any type or form of cover, enclosure, housing, and/or component that is coupled and/or secured to network device 100. In particular, panel 102 may represent any physical element of network device 100 that is capable of visually displaying (and/or audibly indicating), to a user of network device 100, the status of one or more network ports and/or links facilitated by network device 100. Panel 102 may represent a physical element of network device 100 that at least partially provides structure for physical/mechanical support of the network ports, e.g., a support structure for one or more network ports and/or network cards including one or more network ports that may be connected to or "plugged in" to network device 100. In some examples, port-status and/or link-status indicators may be located elsewhere on network device 100 rather than panel 102. For example, port-status and/or link-status indicators may be located on a chassis of network device 100, a network card connected to network device 100, or any other suitable location of network device 100.

In some examples, panel 102 may include one or more arrays of indicators, such as network port-status indicator array 106. The term "indicator," as used herein, generally refers to any physical element that, alone or in combination with one or more additional indicators, visually (and/or audibly) indicates whether a specific network port and/or link is functional (e.g., currently capable of receiving and/or forwarding network traffic), non-functional (e.g., broken, disabled, etc.), or of a state in between functional and non-functional (e.g., operating at reduced functionality, currently linking and/or establishing or re-establishing a link, etc.). In some examples, panel 102 may include one or more indicators that are not arranged in one or more arrays. For example, network port-status indicator array 106 may include one or more indicators according to an arrangement other than in an array, such as one or more port-status indicators arranged in one or more predetermined locations on panel 102, on one or more network cards, on a chassis of network device 100, and the like.

In some examples, an indicator may operate in various modes that each correspond to a different status of a network link. For example, an indicator of network port-status indicator array 106 may include one or more LEDs. These LEDs may be configured to display light in a particular color (e.g., green) to indicate that a network link is functional, to display light in another color (e.g., red) when the network link is non-functional, and to display light in another color (e.g., yellow) to indicate that the network link is in some other state, e.g., reduced functionality, linking, and the like. In addition, the LEDs may be configured to blink and/or flash (e.g., periodically turn on and off) for a predetermined amount of time and/or a predetermine amount of blinks and/or flashes, remain on, or remain off to identify or indicate a particular network link or network port and/or its status (as will be explained in greater detail below).

Network port-status indicator array 106 generally represents any group or cluster of one or more indicators that correspond to network ports on network device 100. In one example, network port-status indicator array 106 may include an indicator for each network port on network device 100. In other words, the number of indicators within network port-status indicator array 106 may directly correspond to or match the number of network ports on network device 100. In addition, each indicator within port-status network indicator array 106 may represent and/or may be assigned to and/or associated with a specific network port.

Computing device 104 includes processing circuitry 108, memory 110 and interface 112. Processing circuitry 108 generally represents any type or form of hardware-implemented computing device capable of interpreting and/or executing computer-readable instructions. In one example, processing circuitry 108 may direct network port-status indicator array 106 to indicate statuses of network links on a network device. Examples of processing circuitry 108 include, without limitation, general purpose microprocessors, microcontrollers, central processing units (CPUs), graphics processing units (GPUs), field-programmable gate arrays (FPGAs), application-specific integrated circuits (ASICs), digital signal processors (DSPs), portions of one or more of the same, variations or combinations of one or more of the same, and/or any other suitable processing device or other equivalent integrated or discrete logic circuitry.

Memory 110 may be configured to store information within computing device 104 during operation. Memory 110 may include a computer-readable storage medium or computer-readable storage device. In some examples, memory 110 include one or more of a short-term memory or a long-term memory. Memory 110 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 110 is used to store program instructions for execution by processing circuitry 108. Memory 110 may be used by software or applications running on computing device 104 to temporarily store information during program execution.

Interface 112 may be configured to receive a command. For example, interface 112 may be configured to receive a command from a network operator. In some examples, interface 112 may be coupled to a device having a user interface configured to facilitate the entry of a command, e.g., by a user. In some examples, interface 112 may include a user interface configured to facilitate the entry of a command, e.g., by a user.

In some examples, processing circuitry 108 may be configured to reconfigure network port-status indicator array 106 to represent a network link-status of one or more network links of at least one network port of network device 100, e.g., in response to a command. For example, network device 100 may include a network card including a plurality of network ports, e.g., 16 network ports, and network port-status indicator array 106 may include a network port-status indicator for each of the network ports. A user may input a command, e.g., via interface 112 configured to receive user input commands and communicate the commands to processing circuitry 108, selecting one of the network ports. Processing circuitry 108 may configure the network port-status indicator for the selected port to indicate the network port-status of the selected network port, and processing circuitry 108 may reconfigure one or more of any of the other network port-status indicators of network port-status indicator array 106 to indicate a link-status of one or more network links of the selected port. As a further example, the selected network port may be designated as a network port belonging to a first set of network ports, e.g., network port 0 may be selected, and may be designated as part of the set of network ports 0-7. Each of the 16 network ports in the example may be configured to support one or more network links, e.g., 8 network links for each of the sixteen ports. Processing circuitry 108 may be configured to reconfigure the network port-status indicators for network ports 8-15 to indicate a network link-status of the selected network port, e.g., port 0. The user may then commission and/or troubleshoot the network links of port 0, e.g., without issuing further CU and/or VTY commands to determine the link-status of the network links of port 0, which is instead indicated by the network port-status indicators for network ports 8-15.

In some examples, processing circuitry 108 may be configured to reconfigure one or more network port-status indicators to represent the link status of one or more network links of other network ports, e.g., to reconfigure network port-status indicators to represent the status of other network links. Continuing with the example above, a user may input another command selecting a different network port, e.g., network port 15. In some examples, the selected network port, e.g., network port 15, which may be designated as belonging to a second and/or different set of network ports from the previously selected network port, e.g., network port 0. Processing circuitry 108 may be configured to reconfigure network port-status indicators for network ports 8-15 to indicate the status of their respective network ports and may reconfigure network port-status indicators for network ports 0-7 to indicate a network link-status of the network links of the selected network port, e.g., network port 15. The user may then commission and/or troubleshoot all of the network links of network port 15, e.g., without issuing further CLI and/or VTY commands to determine the link-status of each of the network links of network port 15, which is instead indicated by the network port-status indicators for network ports 0-7.

In some examples, processing circuitry 108 may be configured to reconfigure network port-status indicators to represent the network link status of other network ports belonging to the same set of network ports. Continuing with the example above, a user may input another command selecting a different network port, e.g., network port 14, which may be designated to be in the same set of network ports as the previously selected network port 15. Processing circuitry 108 may reconfigure network port-status indicators for network ports 0-7 to indicate a network link-status of the network links of the selected network port, e.g., network port 14. The user may then commission and/or troubleshoot all of the network links of network port 14, e.g., without issuing further CLI and/or VTY commands to determine the network link-status of each of the network links of port 14, which is instead indicated by the network port-status indicators for network ports 0-7.

Figure 2:
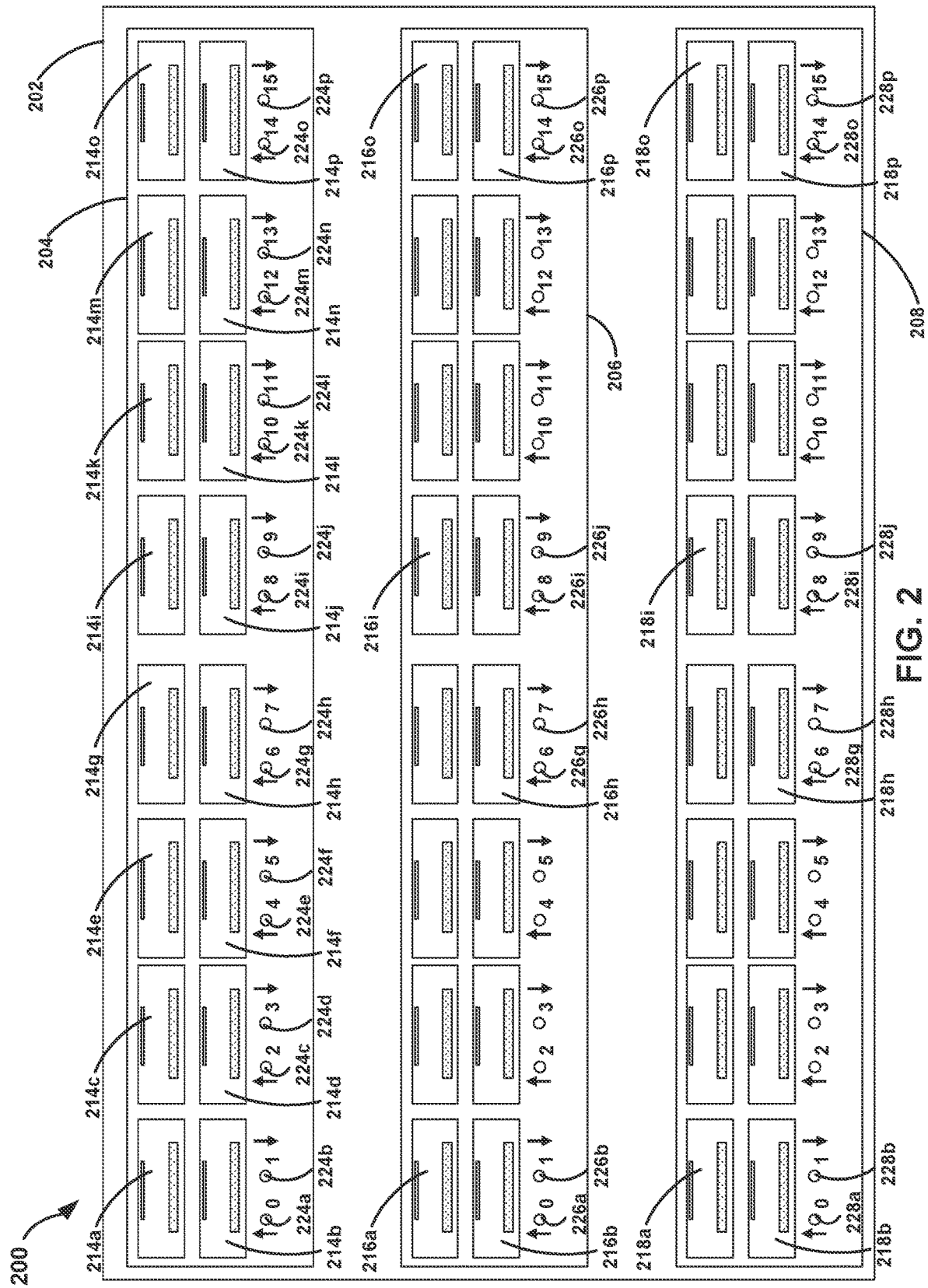
FIG. 2 is a block diagram illustrating an example network device including network ports and network port-status indicators, in accordance with one or more examples described in this disclosure.

Network device 100 of FIG. 1 may be implemented in a variety of ways. For example, all or a portion of network device 100 may represent portions of network device 200 of FIG. 2. FIG. 2 is a block diagram illustrating an example network device 200 including network ports and network port-status indicators, in accordance with one or more examples described in this disclosure. In the example shown, network device 200 includes panel 202, first network card 204, second network card 206, and third network card 208, collectively referred to as "network cards 204-208."

In the example shown, each of network cards 204-208 includes a plurality of network ports 214-218 and network port-status indicators 224-228. For example, first network card 204 includes 16 network ports 214a-214p and network port-status indicators 224a-224p, second network card 206 includes 16 network ports 216a-216p and network port-status indicators 226a-226p, and third network card 208 includes 16 network ports 218a-218p and network port-status indicators 228a-228p. It should be noted that not all of network ports 216a-216p, network port-status indicators 226a-226p, network ports 218a-218p and network port-status indicators 228a-228p are labeled for simplicity purposes. Although the network device 200 includes three network cards 204-208 which each include 16 network ports and 16 network port-status indicators, in some examples network device 200 may include more or fewer network cards, each of which may include more or fewer network ports and network port-status indicators. In some examples, one or more of network ports 214-218 may support a plurality of network links.

Network device 200 may be an example of a network device configured to reduce the number of indicators and associated space and hardware used to support the indicators, e.g., by configuring network port-status indicators 224-228 to indicate a network link identifier and/or a link status for any network port of network device 200, e.g., for any of network ports 214-218.

In some examples, network port-status indicators 224-228 may be configured to indicate a network port identity and/or status or a network link identity and/or status, e.g., by emitting light, not emitting light, emitting a sound, or any other suitable indicator to the user. In some examples, network port-status indicators 224-228 may be LEDs configured to indicate a network port identity and/or status or a network link identity and/or status by emitting a predetermined color associated with the identity and/or status. For example, network port-status indicators 224-228 may be configured to emit green light when an associated network port or network link is functional, to emit red light when the network port or network link is non-functional, and to emit yellow light to indicate that the associated network port or network link is in some other state, e.g., reduced functionality, linking, and the like. Although described using green, red, and yellow, network device 200 may use any color that may be associated with any status. In some examples, network port-status indicators 224-228 may be configured emit light (of any color, e.g., the indicator is "on") to indicate that the associated network port or network link is a first status (e.g., functional) and to not emit light (e.g., the indicator is "off") to indicate that the associated network port or network link is a second status (e.g., non-functional) different from the first status.

In some examples, network port-status indicators 224-228 may be configured to indicate a network port-status or a network link-status in a particular way or manner, e.g., by intermittently emitting light, a sound, etc. For example, network port-status indicators 224-228 may be LEDs configured to indicate a port-status or a link-status by blinking and or flashing light of any color and/or a predetermined color. For example, network port-status indicators 224-228 may be configured to blink, blink for a predetermined time, blink for a predetermined number of blinks, blink in a particular predetermined pattern, or blink at a particular predetermined speed or periodicity to indicate the identity and/or status of an associated network port or network link. In some examples, processing circuitry of network device 200, e.g., processing circuitry 108, may be configured to cause one or more of network port-status indicators 224-228 to indicate an identifier and/or a status one or more of network ports 214-218 and/or one or more network links of one or more of network ports 214-218 by blinking, blinking for a predetermined time, blinking for a predetermined number of blinks, blinking in a particular predetermined pattern, or blinking at a particular predetermined speed or periodicity. For example, a user may input a command via an interface (such as interface 112 of FIG. 1) of network device 200 selecting network port 214a. Processing circuitry 108 may configure network port-status indicator 224a to represent the status of network port 214a and/or that network port 214a is currently selected, and may cause one or more of the other network port-status indicators, e.g., network port status indicator 224b to indicate a link identifier of a link of network port 214a, such as blinking 8 times to indicate network link "8" of network port 214a. Processing circuitry 108 may then configure and/or reconfigure the same network port-status indicator, e.g., network port status indicator 224b, to indicate the link status of the identified link, e.g., of link "8" of network port 214a, such as by emitting light of a predetermined color associated with the link-status of the link "8" for a predetermined amount of time. In some examples, processing circuitry may configure and/or reconfigure a different network port-status indicator than network port status indicator 224b to indicate the link status of the identified link.

In the example shown, each network port-status indicator of network port-status indicators 224-228 are associated with a network port of network ports 214-218, e.g., on a one-to-one basis. For example, network port-status indicator 224a (labeled as "0" for network card 204) is associated with network port 214a, network port-status indicator 224b (labeled as "1" for network card 204) is associated with network port 214a, and so on, up to network port-status indicator 228p (labeled as "15" for network card 208) associated with network port 218p. In some examples, network device 200, and/or processing circuitry 108 or memory 110 may designate one or more of network ports 214-218 and the associated network port-status indicators 224-228 as being part of a set of network ports and network port-status indicators. For example, network device 200 may designate network ports 214a-214h and the associated network port-status indicators 224a-224h as being a first set of network ports and network port-status indicators of network card 204, and network ports 214i-214p and the associated network port-status indicators 224i-224p as being a second set of network ports and network port-status indicators of network card 204. Network device 200 may do the same for network cards 206-208, e.g., designate network ports 216a-216h and the associated network port-status indicators 226a-226h as being a first set of network ports and network port-status indicators of network card 206, network ports 216i-216p and the associated network port-status indicators 226i-226p as being a second set of network ports and network port-status indicators of network card 206, and the same for network card 208. In some examples, network device 200 may designate sets of network ports and associated network port-status indicators independently of network cards, e.g., a first set corresponding to network ports 214a-h (and the associated indicators), a second set corresponding to network ports 214i-p, a third set corresponding to network ports 214a-h, and so forth up to a sixth set corresponding to network ports 228i-p.

In some examples, the network port-status indicators of one set may be configured to indicate a link-status and/or identifier of one or more links of one or more network ports of a different set of network ports. For example, a user may input a command, via an interface (such as interface 112 of FIG. 1), selecting a network port of a first set of network ports, e.g., network port 214a. Processing circuitry of network device 200, e.g., processing circuitry 108, may configure network port-status indicator 224a to indicate a status and/or identifier of network port 214a, e.g., network port-status indicator 224a being a part of a first set of network port-status indicators. Processing circuitry 108 may configure or reconfigure network port-status indicators 224i-224p to indicate a status and/or identifier of one or more network links of network port 214a, e.g., network port-status indicators 224i-224p being a part of a second set of network port-status indicators. In some examples, network device 200 may cause one or more indicators to indicate a link-status and/or identifier of one or more links of one or more network ports via concurrently outputting two or more indications in combination, e.g., blinking a predetermined number of times in a predetermined color associated with a link-status. For example, processing circuitry 108 may configure one or more of network port-status indicators 224-228 to indicate a link-identifier of one or more network links of one or more network ports by blinking 3 times in green to indicate network link "3" (identifier) is functional (status), or to blink 3 times in red to indicate network link "3" is non-functional.

In some examples, network device 200 or processing circuitry of network device 200 may switch the configuration of the network port-status indicators between indicating the network port status and/or identifier of a network port and indicating the network link status of a network link of a network port. For example, a user may input a command to select a different network port from a different set of network ports, e.g., port 214*p*. Processing circuitry 108 may then configure or reconfigure network port-status indicator 224*p* to indicate a status and/or identifier of network port 214*p*, e.g., network port-status indicator 224*p* being a part of the second set of network port-status indicators. Processing circuitry 108 may configure or reconfigure network port-status indicators 224*a*-224*h* to indicate a status and/or identifier of one or more network links of network port 214*p*, e.g., network port-status indicators 224*a*-224*h* being a part of a first set of network port-status indicators.

In some examples, network device 200 or processing circuitry of network device 200 may configure or reconfigure network port-status indicators of different network cards, e.g., without regard to whether the network port-status indicators are part of one card and a selected network port is part of another network card. For example, a user may input a command to select a different network port on a different network card, e.g., network port 218*o*. Processing circuitry 108 may then configure or reconfigure network port-status indicator 228*o* to indicate a status and/or identifier of network port 218*o*, e.g., network port-status indicator 228*o* being a part of the second set of network port-status indicators of network card 208 (or alternatively a sixth set of network port-status indicators of network device 200). Processing circuitry 108 may configure or reconfigure network port-status indicators 226*a*-226*h* to indicate a status and/or identifier of one or more network links of network port 218*o*, e.g., network port-status indicators 226*a*-226*h* being a part of a first set of network port-status indicators of network card 206 (or a third set of network port-status indicators of network device 200).

Figure 3:
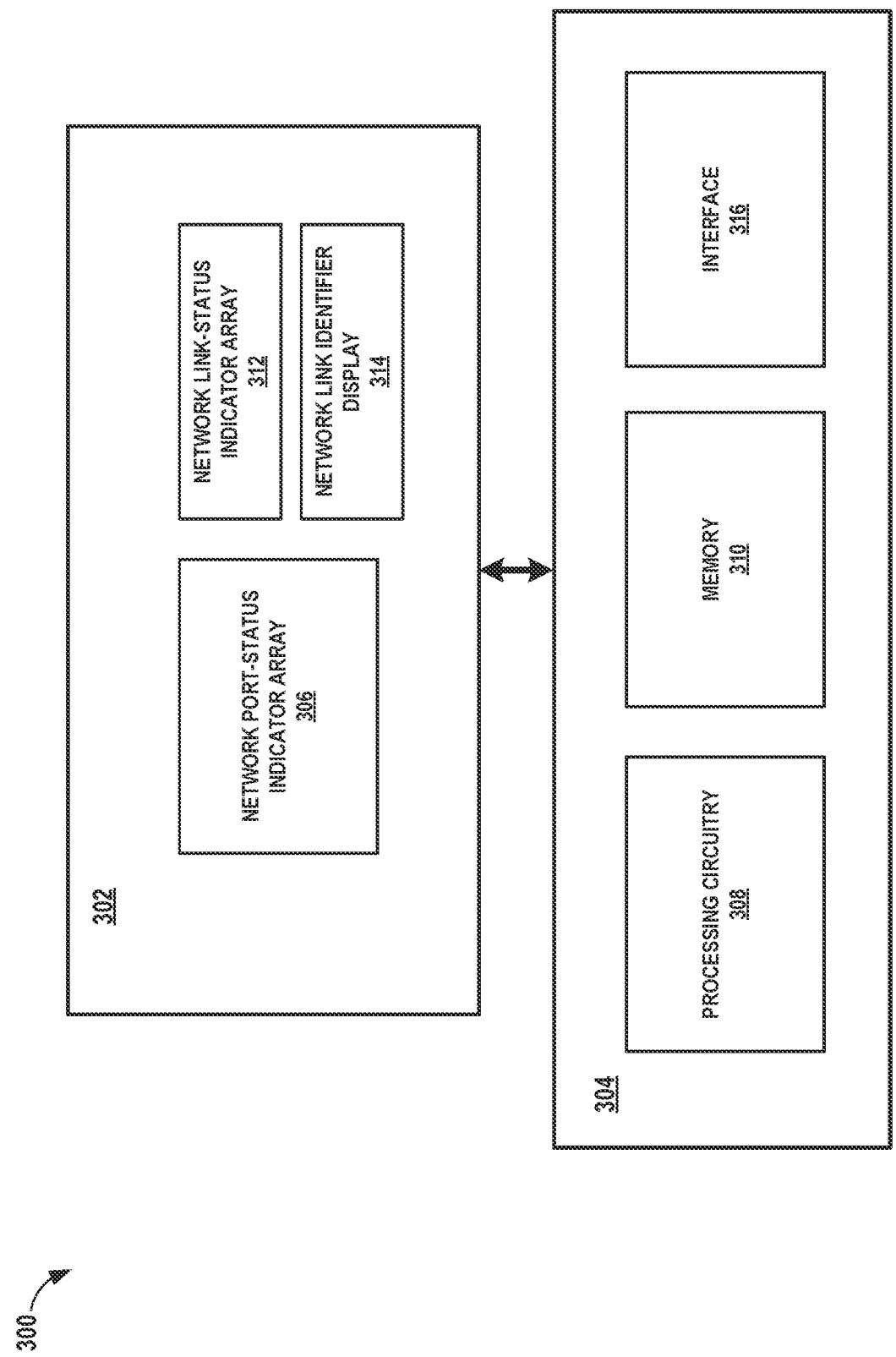
FIG. 3 is a block diagram illustrating another example network device including network port-status indicators and network link-status indicators, in accordance with techniques described in this disclosure.

FIG. 3 is a block diagram illustrating another example network device 300 including network port-status indicators and network link-status indicators, in accordance with techniques described in this disclosure. In the example shown, network device 300 includes panel 302 and computing device 304.

In some examples, network device 300 may be the same as, or substantially similar to, network device 100 of FIG. 1, except that network device 300 additionally includes network link-status indicator array 312 and, optionally in some examples, network link identifier display 314.

Panel 302 may be the same as, or substantially similar to, panel 102 of FIG. 1, except that panel 302 additionally includes network link-status indicator array 312 and, optionally in some examples, network link identifier display 314. For example, panel 302 may include network port-status indicator array 306, which may be substantially similar to network port-status indicator array 106 described above. In some examples, panel 202 may include one or more indicators that are not arranged in one or more arrays. For example, network port-status indicator array 306 may include one or more indicators according to an arrangement other than in an array, such as one or more port-status indicators arranged in one or more predetermined locations on panel 302, on one or more network cards, on a chassis of network device 300, and the like.

Network link-status indicator array 312 generally represents any group or cluster of one or more indicators that correspond to network links of one or more network ports of network device 300. In one example, network link-status indicator array 312 may include an indicator for each network link of one or more network ports of network device 300. In some examples, the number of indicators within network link-status indicator array 312 may be fewer than the number of network links of one or more network ports of network device 300. In some examples, network link-status indicator array 312 may include a single indicator.

In some examples, the indicators of network link-status indicator array 312 may operate in various modes that each correspond to a different status of a network link. For example, an indicator of network link-status indicator array 312 may include one or more LEDs. These LEDs may be configured to display light in a particular color (e.g., green) to indicate that a network link is functional, to display light in another color (e.g., red) when the network link is non-functional, and to display light in another color (e.g., yellow) to indicate that the network link is in some other state, e.g., reduced functionality, linking, and the like. In addition, the LEDs may be configured to blink and/or flash (e.g., periodically turn on and off), blink for a predetermined time, blink for a predetermined number of blinks, blink in a particular predetermined pattern, or blink at a particular predetermined speed or periodicity, remain on, or remain off to identify or indicate a particular network link or network port and/or its status (as will be explained in greater detail below).

In some examples, network device 300 may include a plurality of multi-link network ports, e.g., similar to network device 100 described above. In some examples, individual network links of each network port of network device 300 may be defined and/or identified by a link identifier, e.g., often as a number (alternatively referred to as a lane or channel number). As an example, network device 300 may include one or more network ports that each facilitate multiple network links, e.g., four network links. Network device 300 or processing circuitry 308 (described below) may designate the four network links within each multi-link network port by a network link number, e.g., network links 0-3. As such, each network link may be identifiable by a port identifier (e.g., such as a port number designating one of the plurality of network ports of network device 300) and a link identifier, e.g., a port number/link number pair.

Network link identifier display 314 may be configured to display a link identifier of a link of network device 300. In some examples, network link identifier display 314 may be any type of display, e.g., a liquid-crystal display (LCD), a LED display, a cathode-ray tube (CRT) display, an electroluminescent display, and the like. In some examples, network link identifier display 314 may be configured to display one or more alphanumeric characters, an image, a code, or any visual information of any visual information type suitable for visually communicating a link identifier.

In some examples, the number of network link-status indicators of network link-status indicator array 312 may correspond to the highest number of network links facilitated by an individual network port on network device 300. In other examples, the number of network link-status indicators within network link-status indicator array 312 may be fewer than the number of network links facilitated by one or more individual network ports. For example, network device 300 may use multiple network link indicator outputs, alone or in combination, to identifying a particular link and/or its status. For example, network link-status indicator array 312 and network link identifier display 314 may combine to indicate the identity and status of one or more network links via displaying a color, blinking, displaying a brightness and/or brightness change, displaying an alphanumeric character or other character, displaying an image, displaying a code, or any visual information of any visual information type suitable for visually communicating a network link identifier and/or network link status.

Computing device 304, processing circuitry 308, memory 310, and interface 316 may all be the same as, or substantially similar to, computing device 104, processing circuitry 108, memory 110 and interface 112 of FIG. 1, respectively.

Interface 316 may be configured to receive a command. For example, interface 316 may be configured to receive a command from a network operator. In some examples, interface 316 may be coupled to a device having a user interface configured to facilitate the entry of a command, e.g., by a user. In some examples, interface 316 may include a user interface configured to facilitate the entry of a command, e.g., by a user.

In some examples, processing circuitry 308 may be configured to configure one or more network link-status indicators of network link-status indicator array 312 and/or network link identifier 314 display to represent a link-identifier and/or link-status of one or more network links of one or more network ports, and to reconfigure one or more network link-status indicators of network link-status indicator array 312 and/or network link identifier display 314 to represent a link-identifier and/or link-status of one or more other network links of one or more network ports, e.g., in response to a command entered by a user via interface 316.

In some examples, network device 300 may designate one or more network ports as belonging to a first set of network ports, and one or more other network ports and belonging to a second set of network ports. Processing circuitry 308 may be configured to reconfigure one or more network link-status indicators of network link status indicator array 312 from representing a link-status of one or more network links of the first set of network ports to represent a link-status of one or more network links of the second set of network ports.

In some examples, processing circuitry 308 may be configured to cause network link identifier display 314 to indicate the link identifier of one of the one or more network links and to reconfigure one or more network link-status indicators of network link status indicator array 312 to represent the network link-status of the link corresponding to the network link identifier displayed by network link identifier display 314.

Figure 4:
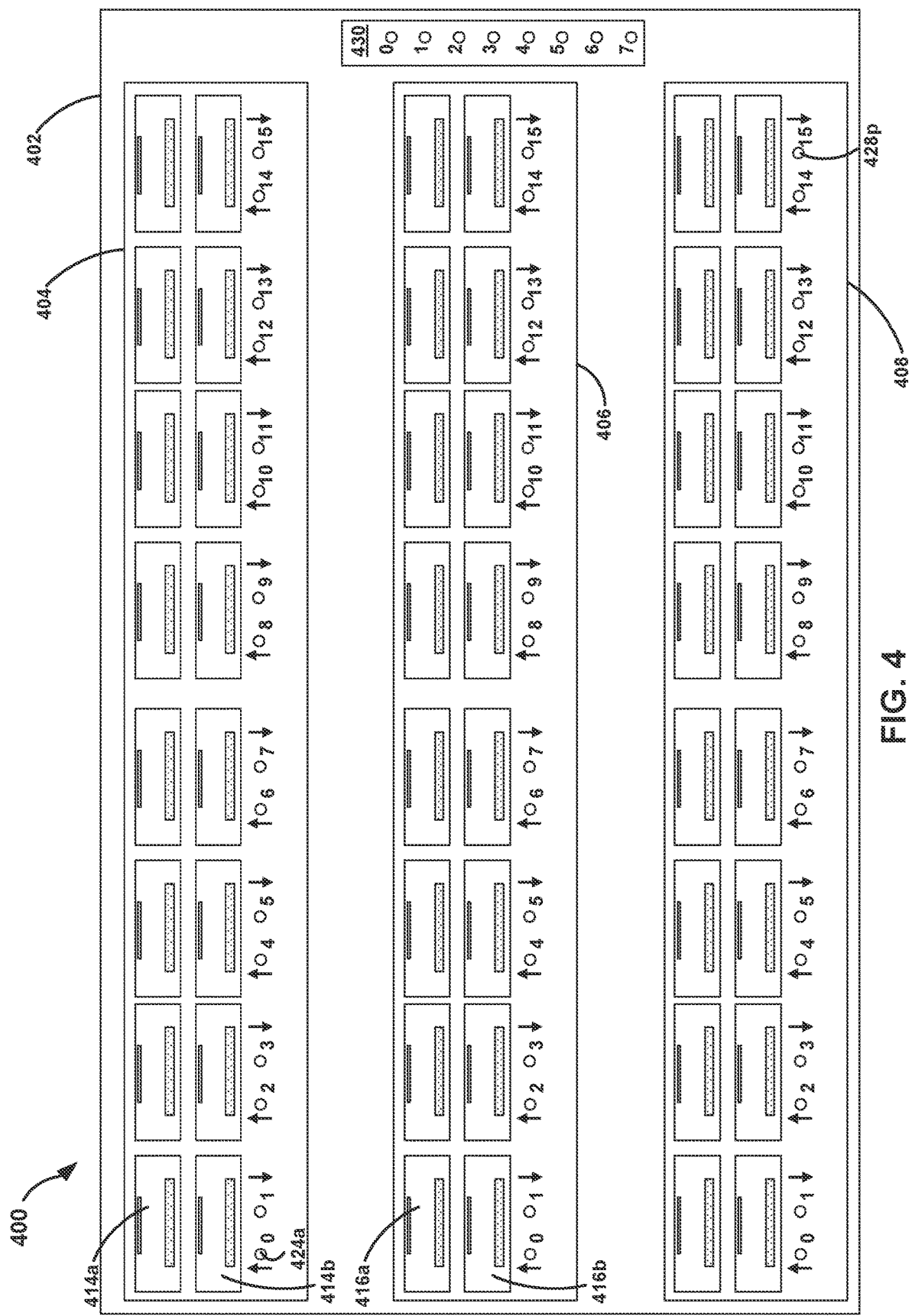
FIG. 4 is a block diagram illustrating an example network device including network port-status indicators and network link-status indicators, in accordance with one or more examples described in this disclosure.

Network device 300 of FIG. 3 may be implemented in a variety of ways. For example, all or a portion of network device 300 may represent portions of network devices 400, 500, 600, 700, and/or 800 of FIGS. 4-8. FIG. 4 is a block diagram illustrating an example network device 400 including network port-status indicators and network link-status indicators, in accordance with one or more examples described in this disclosure. In the example shown, network device 400 includes panel 402, first network card 404, second network card 406, third network card 408, collectively referred to as "network cards 404-408," and network link-status indicator array 430.

In the example shown, each of network cards 404-408 includes a plurality of network ports 414-418 and network port-status indicators 424-428. Each of network device 400, network cards 404-408, and network ports 414-418 may be the same as, or substantially similar to, network device 200, network cards 204-208, and network ports 214-218 of FIG. 2 described above, with the exception that network device 400 includes network link-status indicator array 430. Network port-status indicators 424-428, e.g., network port-status indicators 424a-428p, may be the same as, or substantially similar to, network port-status indicators 224-228 of FIG. 2 described above with the exception that network port-status indicators 424-428 may not be configured to represent a network link identifier and/or status, e.g., instead, network link-status indicator array 430 may be configured to represent a network link identifier and/or status of one or more network links.

Network device 400 may be an example of a network device configured to reduce the number of indicators and associated space and hardware used to support the indicators, e.g., by providing network link-status indicator array 430 housed by panel 402 (or elsewhere on a chassis of network device 400) which may indicate the link-status of a number of network links for any number of ports included with network device 400 and/or added to network device 400, e.g., by plugging in one more network cards including multi-link network ports to network device 400. For example, network link-status indicator array 430 includes 8 network link-status indicators 0-7 which may be configured to indicate a network link-status of 8 network links of any of network ports 414-418. In some examples, one or more ports of network ports 414-418 may support and/or include more than 8 network links, and one or more indicators of network link-status indicator array 430 may be configured to emit different colors, turn on or off, blink, or otherwise indicate a status of more than one network link of the network port. In other words, network link-status indicator array 430 may indicate the link-status of more links than indicators included in network link-status indicator array 430 by indicating, emitting, displaying, multiple output types, e.g., color, brightness, blinking and/or blink patterns, or in some examples, network by including sound and/or audible output such as sound frequencies, tones, amplitudes, words, etc. In some examples, network device 400 may be configured to include a variable number of network ports, e.g., any of network cards 404-408 may be added and/or removed, and in some examples more than three network cards may be added and/or removed from network device 400. Network link-status indicator array 430 may be configured to indicate a link-status of one or more network links of a port for any number of ports, e.g., added ports. For example, a user may add or "plug in" an additional network card to network device 400 and input a command via an interface (such as interface 316 of FIG. 3) of network device 400 selecting one of the added network ports. Processing circuitry 308 may reconfigure network link-status indicator array 430 to represent a link-status of one or more network links of the added, selected port.

In the example shown, network device 400 may include one or more multi-link network ports, e.g., each network port may include 8 network links each. Network link-status indicator array 430 may be configured and/or reconfigured to represent a link identifier and/or a link-status of each of the 8 network links of any of network ports 414-418.

In some examples, a user may select a first set of network ports, e.g., network ports 414 of network card 404. Network ports 414 may support 4 network links each. Processing circuitry 308 (of FIG. 3) may be configured to configure network link-status indicator array 430 to represent a network link-status of one or more network links of the first set of network ports, e.g., network link-status indicators 0-3 of network link-status indicator array 430 may represent the network link-status of port 414a network links and network link-status indicators 4-7 of network link-status indicator array 430 may represent the link-status of port 414b network links. The user may then select a second set of network ports, e.g., network ports 416 of network card 406. In some examples, network ports 416 may support 4 network links each. Processing circuitry 308 may be configured to reconfigure network link-status indicator array 430 from representing a network link-status of one or more network links of the first set of network ports (e.g., network ports 414a and 414b) to represent a network link-status of one or more network links of the second set of network ports (e.g., network ports 416a and 416b). For example, processing circuitry 308 may reconfigure network link-status indicators 0-3 of network link-status indicator array 430 to represent the network link-status of network port 416a network links and network link-status indicators 4-7 of network link-status indicator array 430 to represent the link-status of network port 416b network links.

Figure 5:
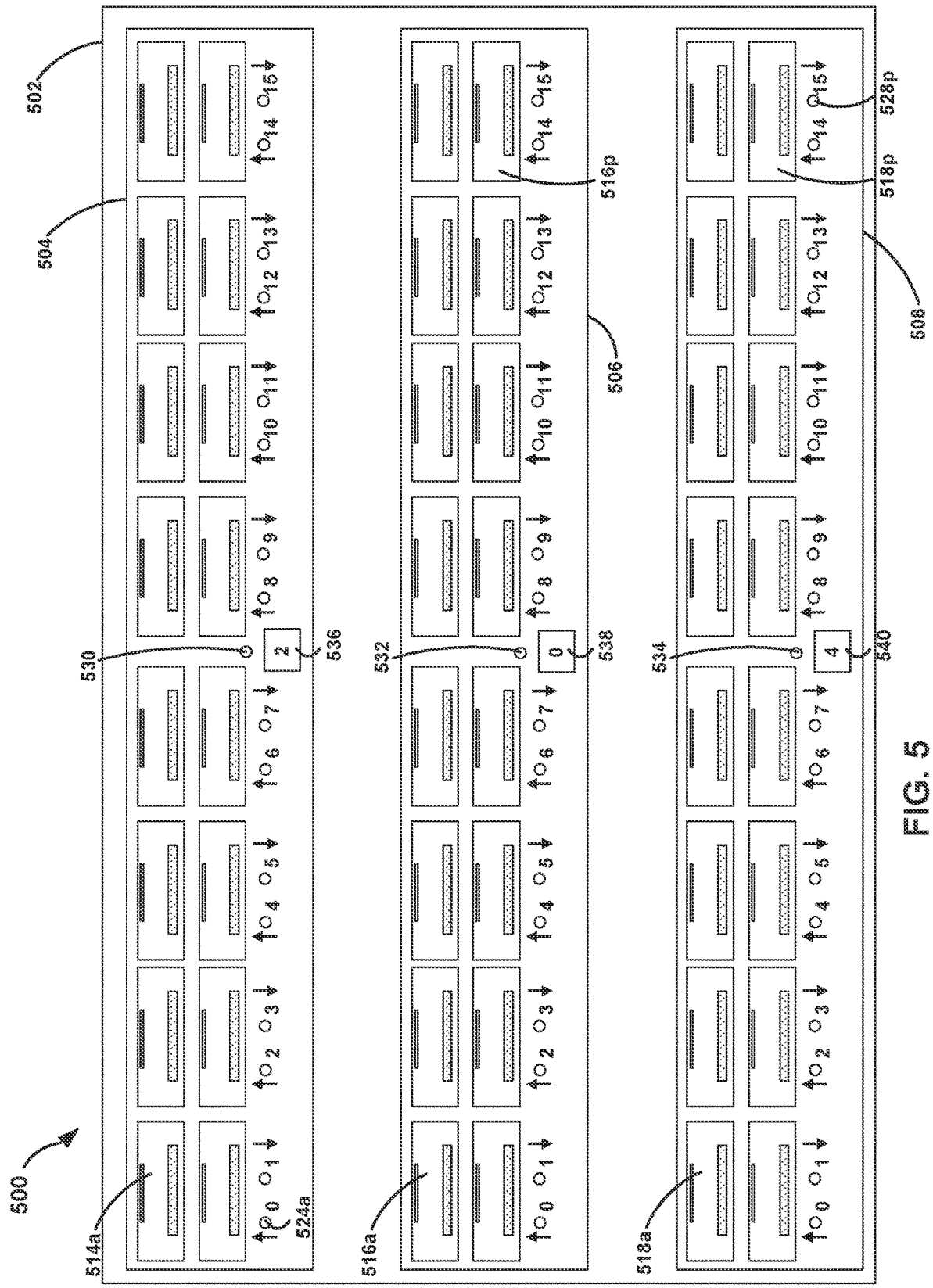
FIG. 5 is a block diagram illustrating another example network device including network port-status indicators and network link-status indicators, in accordance with one or more examples described in this disclosure.

FIG. 5 is a block diagram illustrating another example network device 500 including network port-status indicators and network link-status indicators, in accordance with one or more examples described in this disclosure. In the example shown, network device 500 includes panel 502, first network card 504, second network card 506, third network card 500, collectively referred to as "network cards 504-508," and network link-status indicators 530, 532, 534 and network link identifier displays 536, 538, 540.

In the example shown, each of network cards 504-508 includes a plurality of network ports 514-518 and network port-status indicators 524-528. Each of network device 500, network cards 504-508 may be the same as, or substantially similar to, network device 400 and network cards 404-408 of FIG. 4 described above, with the exception that network device 500 does not include network link-status indicator array 430 (or any network link-status indicators) and each of network cards 504-508 includes one network link-status indicator and one network link identifier display. Network ports 514-518 and network port-status indicators 524-528, e.g., network ports 514a-518p and network port-status indicators 524a-528p, of FIG. 5 may be the same as, or substantially similar to network ports 414-418 and network port-status indicators 424-428 illustrated and described above with reference to FIG. 4.

Network device 500 may be an example of a network device configured to reduce the number of indicators and associated space and hardware used to support the indicators, e.g., by providing a network link-status indicator and a network link identifier display for a predetermined number and/or set of network ports. For example, network device 500 includes one network link-status indicator and one network link identifier display for each of network cards 504, 506, and 508, e.g., for each set of network ports 514, 516, and 518, respectively.

In some examples, network link-status indicators 530, 532, 534 may be configured to represent a link-status of one or more network links of one or more network ports and/or one or more network links of a set of network ports. For example, network link-status indicator 530 may be configured to represent a link status of one or more network links of network ports 514a-514p, network link-status indicator 532 may be configured to represent a link status of one or more network links of network ports 516a-516p, network link-status indicator 534 may be configured to represent a link status of one or more network links of network ports 518a-518p.

In some examples, network link identifier displays 536, 538, 540 may be configured to indicate a link-identifier of one or more network links of one or more network ports and/or one or more network links of a set of network ports. For example, link identifier display 536 may be configured to indicate a link identifier of one or more network links of network ports 514a-514p, link identifier display 538 may be configured to indicate a link identifier of one or more network links of network ports 516a-516p, link identifier display 540 may be configured to indicate a link identifier of one or more network links of network ports 516a-5516p.

In some examples, each of network link identifier displays 536, 538, 540 may be the same as, or substantially similar to network link identifier display 314 of FIG. 3. For example, network link identifier displays 536, 538, 540 may be any type of display, e.g., a liquid-crystal display (LCD), a LED display, a cathode-ray tube (CRT) display, an electroluminescent display, and the like, and may be configured to display one or more alphanumeric characters, an image, a code, or any visual information of any visual information type suitable for visually communicating a link identifier.

In some examples, processing circuitry 308 (of FIG. 3) may be configured to cause one or more of network link identifier displays 536, 538, 540 indicate a link identifier of a network link of a network port and to reconfigure one or more of network link-status indicators 530, 532, 534 to represent a link-status of the link corresponding to the indicated link identifier.

Figure 6:
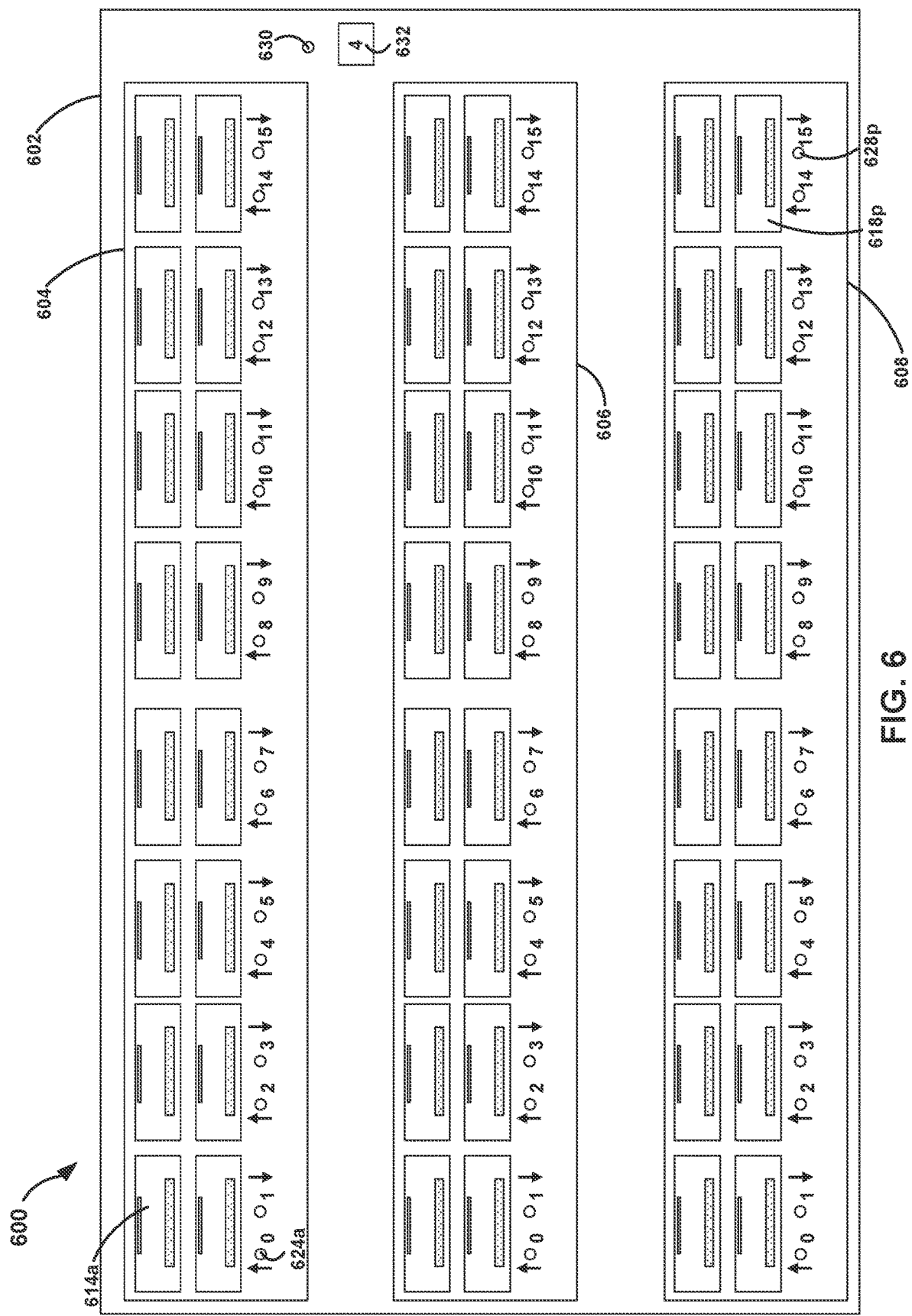
FIG. 6 is a block diagram illustrating another example network device including network port-status indicators and network link-status indicators, in accordance with one or more examples described in this disclosure.

FIG. 6 is a block diagram illustrating another example network device 600 including network port-status indicators and network link-status indicators, in accordance with one or more examples described in this disclosure. In the example shown, network device 600 includes panel 602, first network card 604, second network card 606, third network card 608, collectively referred to as "network cards 604-608," and network link-status indicator 630 and network link identifier display 632.

In the example shown, each of network cards 604-608 includes a plurality of network ports 614-618 and network port-status indicators 624-628, e.g., network ports 614a-618p and network port-status indicators 624a-628p, which may be the same as, or substantially similar to, network device 400, network cards 404-408, network ports 414-418, and network port-status indicators 424-428 of FIG. 4 described above. Network device 600 may be the same as, or substantially similar to, network device 400 with the exception that panel 602 includes network link-status indicator 630 and network link identifier display 632 rather than network link-status indicator array 430. Network link-status indicator 630 and network link identifier display 632 may be the same as, or substantially similar to, network link-status indicators 530, 532, 534 and network link identifier displays 536, 538, 540 illustrated and described above with reference to FIG. 5, with the exception that network link-status indicator 630 and network link identifier display 632 are located on panel 602 and may be configured to indicate a network link status and a network link identifier, respectively, of one or more network links of any ports included on any network card of network device 600.

Network device 600 may be an example of a network device configured to reduce the number of indicators and associated space and hardware used to support the indicators, e.g., by providing a network link-status indicator and a network link identifier display for one or more network links of any network port of network device 600. In some examples, network, link identifier display 632 may be the same as, or substantially similar to network link identifier display 314 of FIG. 3. For example, network link identifier display 632 may be any type of display, e.g., a liquid-crystal display (LCD), a LED display, a cathode-ray tube (CRT) display, an electroluminescent display, and the like, and may be configured to display one or more alphanumeric characters, an image, a code, or any visual information of any visual information type suitable for visually communicating a link identifier.

In some examples, processing circuitry 308 may be configured to cause network link identifier display 632 indicate a link identifier of a network link of a network port and to reconfigure network link-status indicator 630 to represent a link-status of the link corresponding to the indicated link identifier.

Figure 7:
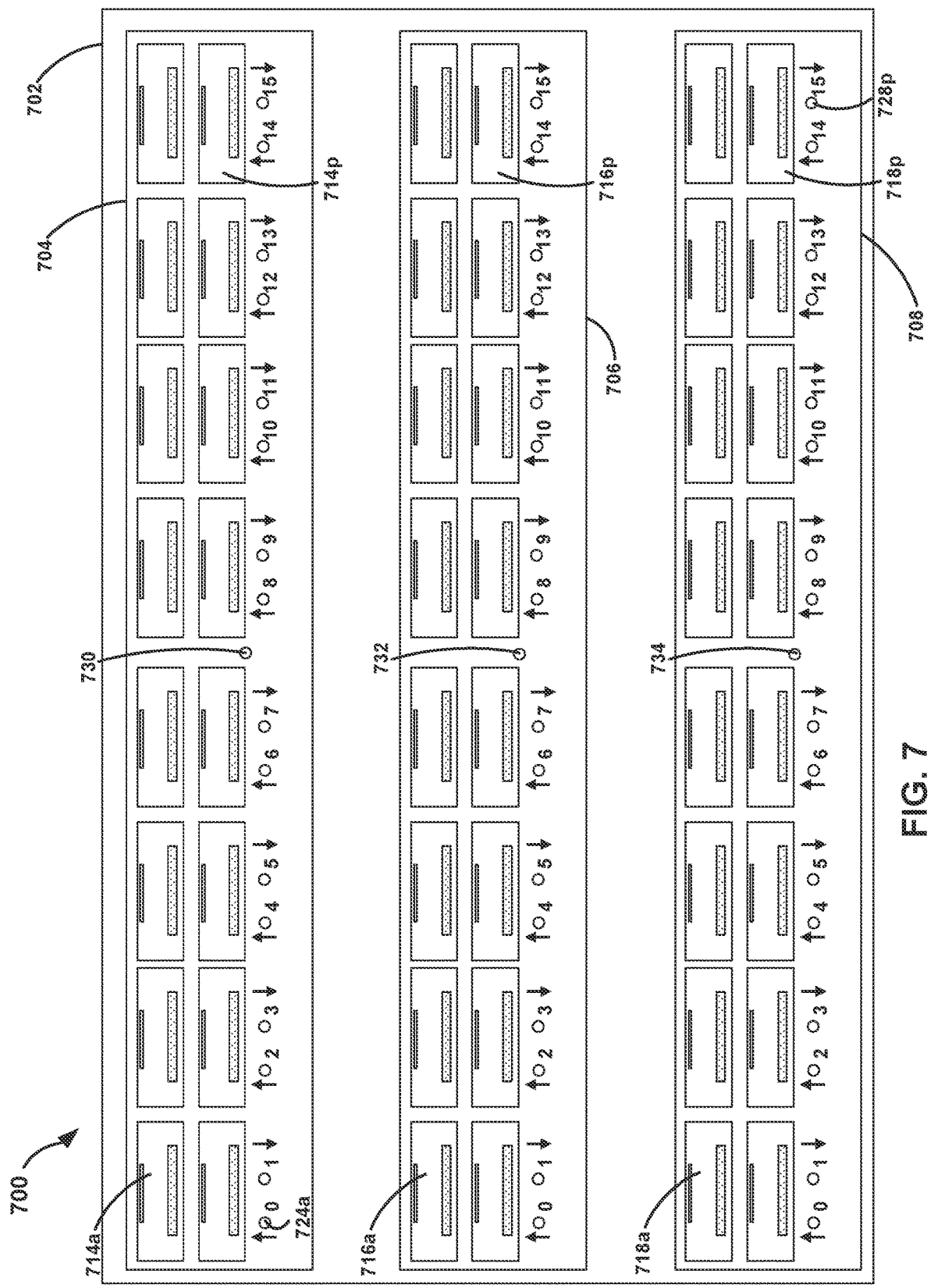
FIG. 7 is a block diagram illustrating another example network device including network port-status indicators and network link-status indictors, in accordance with one or more examples described in this disclosure.

FIG. 7 is a block diagram illustrating another example network device 700 including network port-status indicators and network link-status indictors, in accordance with one or more examples described in this disclosure. In the example shown, network device 700 includes panel 702, first network card 704, second network card 706, third network card 708, collectively referred to as "network cards 704-708," and network link-status indicators 730, 732, 734.

In the example shown, network device 700 and each of network cards 704-708 may be the same as, or substantially similar to, network device 500 and network cards 504-508 of FIG. 5 described above, with the exception that network cards 704-708 do not include network link identifier displays, e.g., network link identifier displays 536, 538, 540. Panel 702, network ports 714-718 and network port-status indicators 724-728, e.g., network ports 714a-718p and network port-status indicators 724a-728p, of FIG. 7 may be the same as, or substantially similar to panel 502, network ports 514-518 and network port-status indicators 524-528 illustrated and described above with reference to FIG. 5.

Network device 700 may be an example of a network device configured to reduce the number of indicators and associated space and hardware used to support the indicators, e.g., by providing a network link-status indicators for a predetermined number and/or set of network ports. For example, network device 700 includes one network link-status indicator for each of network cards 704, 706, and 708, e.g., for each set of network ports 714, 716, and 718, respectively.

In some examples, network link-status indicators 730, 732, 734 may be configured to represent a link-status of one or more network links of one or more network ports and/or one or more network links of a set of network ports as well as to indicate a link identifier of the one or more network links. For example, network link-status indicator 730 may be configured to represent a link status and/or indicate a link identifier of one or more network links of network ports 714a-714p, network link-status indicator 732 may be configured to represent a link status and/or indicate a link identifier of one or more network links of network ports 716a-716p, network link-status indicator 734 may be configured to represent a link status and/or indicate a link identifier of one or more network links of network ports 718a-718p.

In some examples, processing circuitry 308 (of FIG. 3) may be configured to cause one or more of network link-status indicators 730, 732, 734 indicate a link identifier and/or a link-status of a network link of a network port by blinking for a predetermined time or for a predetermined number of blinks. For example, a user may input a command via an interface (such as interface 316 of FIG. 3) of network device 700 selecting network port 714a. Processing circuitry 308 may configure network port-status indicator 724a to represent the status of network port 714a and/or that network port 714a is currently selected. Processing circuitry 308 may cause network link-status indicator 730 to indicate the identifier of one of the network links of network port 714a, such as blinking 8 times to indicate network link "8" of network port 714a. Processing circuitry 308 may then configure and/or reconfigure network link-status indicator 730 to indicate the link status of the identified link, e.g., of link "8" of network port 714a, such as by emitting light of a predetermined color associated with the link-status of the link "8" for a predetermined amount of time. Similarly, network link-status indicator 732 and network link-status indicator 734 may indicate a link status identifier by blinking followed by representing the link status of the identified link by emitting light of a predetermined color associated with the link-status of the identified link for network ports 716a-p and 718a-p, respectively.

Figure 8:
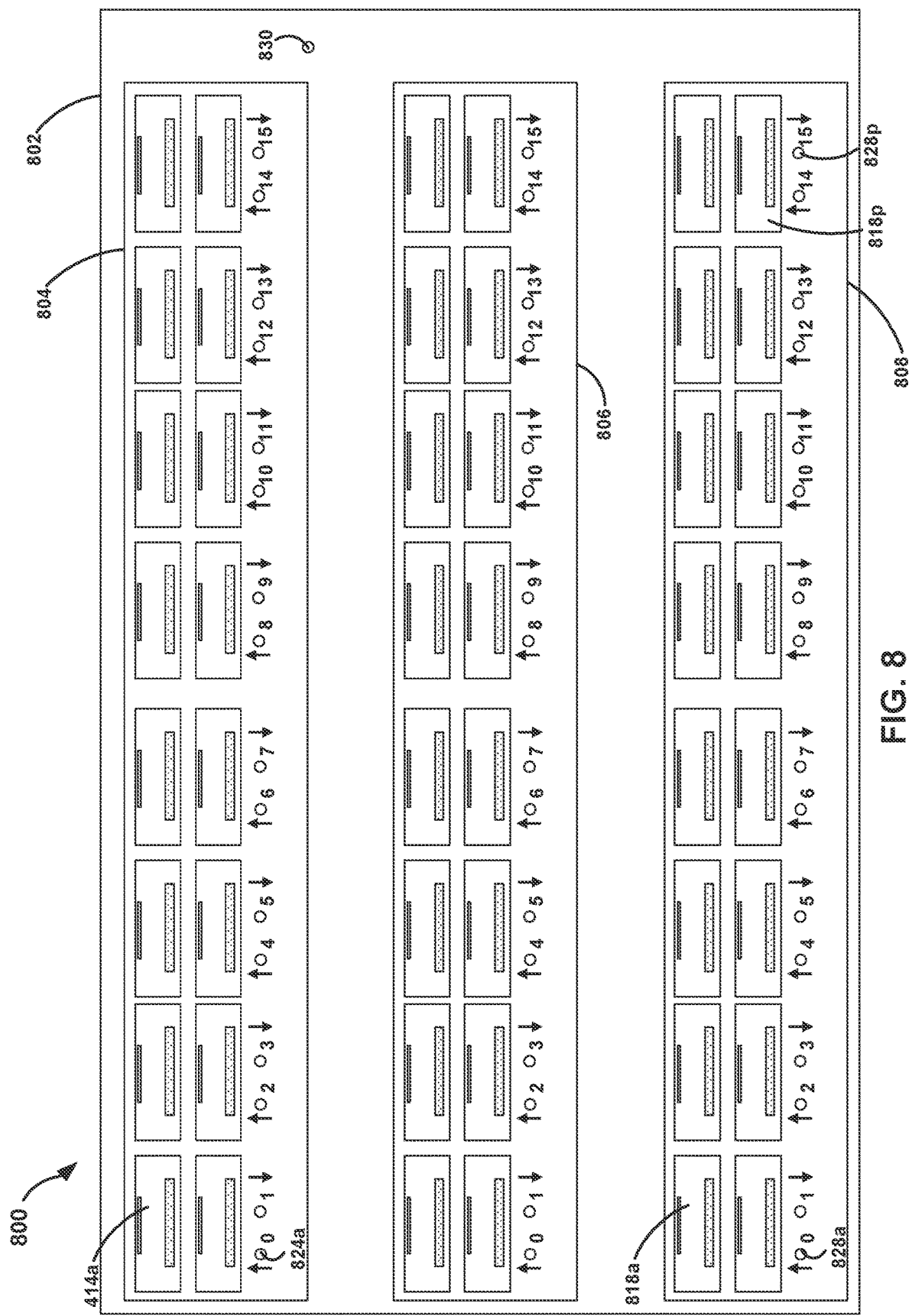
FIG. 8 is a block diagram illustrating another example network device including network port-status indicators and a network link-status indicator, in accordance with one or more examples described in this disclosure.

FIG. 8 is a block diagram illustrating another example network device 800 including network port-status indicators and a network link-status indicator, in accordance with one or more examples described in this disclosure. In the example shown, network device 800 includes panel 802, first network card 804, second network card 806, third network card 808, collectively referred to as "network cards 804-808," and network link-status indicator 830.

In the example shown, each of network cards 804-808 includes a plurality of network ports 814-818 and network port-status indicators 824-828, e.g., network ports 814a-818p and network port-status indicators 824a-828p, which may be the same as, or substantially similar to, network device 400, network cards 404-408, and network port-status indicators 424-428 of FIG. 4 described above. Network device 800 may be the same as, or substantially similar to, network device 400 and/or network device 600 with the exception that panel 802 includes network link-status indicator 830 rather than network link-status indicator array 430 or network link-status indicator 630 and network link identifier display 632. Network link-status indicator 830 may be the same as, or substantially similar to, network link-status indicators 730, 732, 734 illustrated and described above with reference to FIG. 7, with the exception that network link-status indicator 830 may be located on panel 802 and may be configured to indicate a network link status and/or a network link identifier of one or more network links of any ports included on any network card of network device 800.

Network device 800 may be an example of a network device configured to reduce the number of indicators and associated space and hardware used to support the indicators, e.g., by providing a single network link-status indicator 830 to indicate a link identifier and/or a link status for any network port of network device 800, e.g., for any of network ports 814-818.

In some examples, network link-status indicator 830 may be configured to represent a link identifier and/or a link-status of one or more network links of one or more network ports in a particular way and/or manner, e.g., by blinking, turning on or off, emitting a color, or a combination of both at the same time, e.g., by blinking a particular color, or in sequence, e.g., by blinking and then by emitting a color for a predetermined amount of time. For example, a user may input a command via an interface (such as interface 316 of FIG. 3) of network device 800 selecting network port 818a. Processing circuitry 308 (of FIG. 3) may configure network port-status indicator 828*a* to represent the status of network port 818*a* and/or that network port 818*a* is currently selected. Processing circuitry 308 may cause network link-status indicator 830 to indicate the identifier of one of the network links of network port 818*a*, such as blinking 8 times to indicate network link "8" of network port 818*a*, Processing circuitry 308 may then configure and/or reconfigure network link-status indicator 830 to indicate the link status of the identified link, e.g., of link "8" of network port 818*a*, such as by emitting light of a predetermined color associated with the link-status of the link "8" for a predetermined amount of time.

Figure 9:
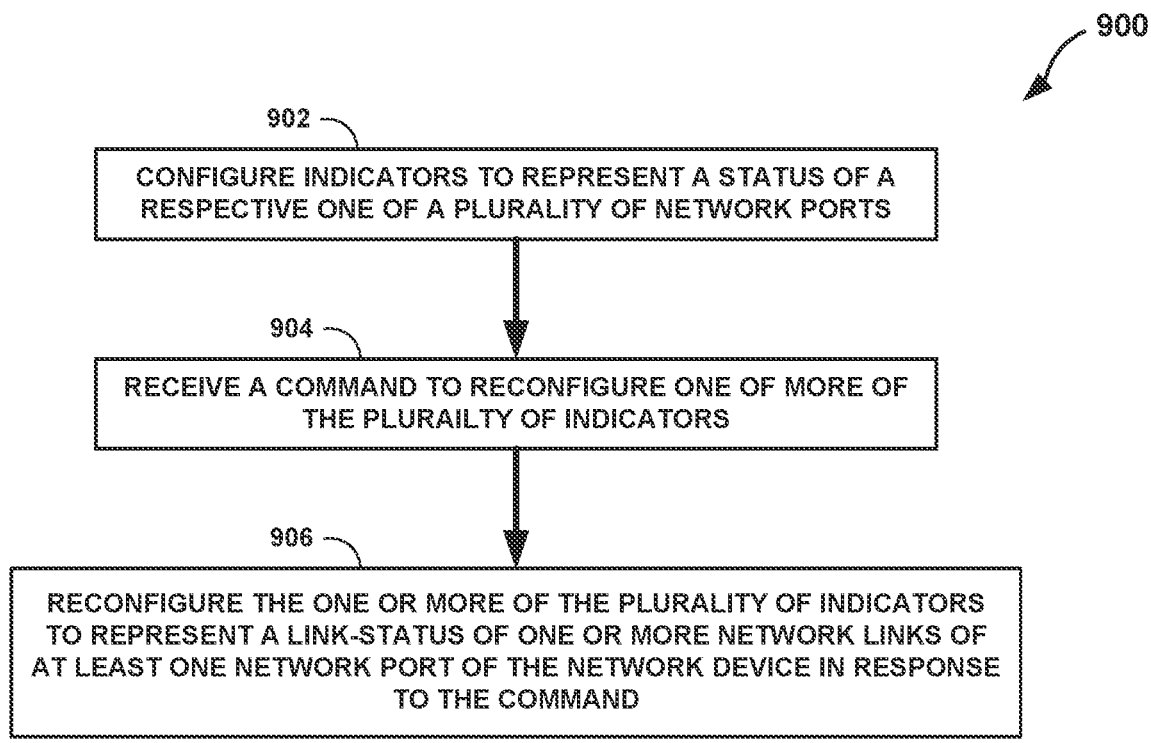
FIG. 9 is a flowchart of an example method of operating a network device, in accordance with one or more examples described in this disclosure.

FIG. 9 is a flowchart of an example method 900 of operating a network device, in accordance with one or more examples described in this disclosure. The method 900 below is described as being executed by processing circuitry 108 of FIG. 1, but may be executed by any networking device and/or processing circuitry, such as processing circuitry 308 of FIG. 3.

Processing circuitry 108 may configure a plurality of indicators to represent a status of a respective one of a plurality of network ports (902). For example, each network port of the plurality of network ports may be configured to facilitate one or more network links between a network device and one or more remote devices, e.g., each network port may be a multi-link network port. For example, processing circuitry 108 may configure network port-status indicator array 106 to represent a network link-status of one or more network links of at least one network port of network device 100.

Processing circuitry 108 may receive a command to reconfigure one or more of the plurality of network port-status indicators (904). For example, a user may input a command, e.g., via interface 112 configured to receive user input commands and communicate the commands to processing circuitry 108, selecting one of the network ports and to reconfigured one or more of network port-status indicators of network port-status indicator array 106.

Processing circuitry 108 may reconfigure the one or more of the plurality of indicators to represent a link-status of the one or more network links of at least one network port of the network device in response to the command (906). For example, processing circuitry 108 may configure a network port-status indicator (e.g., of network port-status indicator array 106) associated with the selected port to indicate the network port-status of the selected network port. Processing circuitry 108 may reconfigure one or more of any of the other network port-status indicators of network port-status indicator array 106 to indicate a link-status of one or more network links of the selected port. In some examples, the selected network port may be designated as a network port belonging to a first set of network ports, and processing circuitry 108 may reconfigure the network port-status indicators for a second set of network ports to indicate a network link-status of the selected network port belonging to the first set of network ports.

In some examples, processing circuitry 108 may reconfigure one or more network port-status indicators to represent a network link status of one or more network links of other network ports, e.g., to reconfigure network port-status indicators to represent the status of other network links. For example, a user may input another command selecting a different network port, which may be designated as belonging to a second and/or different set of network ports from the previously selected network port. Processing circuitry 108 may reconfigure network port-status indicators for the second set of network ports to indicate the status of their respective associated network ports, and may reconfigure network port-status indicators associated with the first set of network ports to indicate a network link-status of the network links of the selected network port belonging to the second set of network ports.

In some examples, processing circuitry 108 may reconfigure one or more network port-status indicators of network port-status indicator array 106 to indicate a network port-status and/or identifier or a network link-status and/or identifier by blinking for a predetermined time or a predetermined number of blinks.

In some examples, processing circuitry 108 may configure a first set of indicators to represent the status of a first set of network ports in response to the command, wherein the command includes a selection at least one network port of the first set of network ports, and configure a second set of indicators to represent the link-status of the one or more network links of the at least one network port of the first set of network ports.

In some examples, the command may be a first command, and processing circuitry 108 may be configure the second set of indicators to represent the status of at least one network port of a second set of network ports in response to a second command, wherein the second command includes a selection of at least one network port of the second set of network ports, and configure the first set of indicators to represent the link-status of the one or more network links of at the least one network port of the second set of network ports.

In some examples, the command may be received from a user via interface 112. In some examples, the plurality of indicators may be light emitting diodes (LEDs). In some examples, each LED of the plurality of indicators may be configured to indicate the status of the at least one network port or the link-status of the one or more network links by emitting a predetermined color associated with a status.

In some examples, processing circuitry 108 may be configured to cause one or more of the plurality of indicators to indicate at least one of an identifier of the one or more network links or a link-status of one or more network links by blinking for a predetermined time or for a predetermined number of blinks.

In some examples, processing circuitry 108 may further configure one or more of the plurality of indicators to indicate the identity of the one or more network links by blinking a predetermined number of times, and configure one or more of the plurality of indicators to indicate the link-status of the identified link by blinking for the number of blinks in a predetermined color associated with the link-status or by following the number of blinks by emitting a predetermined color associated with the link-status for a predetermined amount of time.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network device comprising:
   a plurality of network ports that each facilitate one or more network links between the network device and one or more remote devices;
   a plurality of port-status indicators each configured to represent a port-status of a respective one of the plurality of network ports on the network device; and
   processing circuitry configured to reconfigure a first port-status indicator of the plurality of port-status indicators previously configured to represent a port-status of a first network port to represent a link-status of the one or more network links of a second different network port of the plurality of network ports in response to a command,
   wherein the network device is without dedicated link-status indicators.

2. The network device of claim 1, wherein the processing circuitry is configured to configure a second port-status indicator to indicate an identifier identifying the second port as including the one or more network links for which the first port-status indicator is indicating the link-status in response to the command.

3. The network device of claim 2, wherein the command is a first command, and wherein the processing circuitry is configured to reconfigure the second port-status indicator of the plurality of port-status indicators previously configured to indicate an identifier identifying the second port to represent a link-status of the one or more network links of the first network port of the plurality of network ports in response to a second command, wherein the processing circuitry is configured to reconfigured the first port-status indicator of the plurality of port-status indicators to indicate an identifier identifying the first port as including the one or more network links for which the second port-status indicator is indicating the link-status in response to the second command.

4. The network device of claim 1, wherein the processing circuitry is configured to receive the command from a user via an interface.

5. The network device of claim 1, wherein the plurality of port-status indicators are light emitting diodes (LEDs).

6. The network device of claim 5, wherein each LED of the plurality of port-status indicators is configured to indicate a port-status or a link-status by emitting a predetermined color associated with the status.

7. The network device of claim 1, wherein the processing circuitry is configured to cause one or more of the plurality of port-status indicators to indicate at least one of an identifier of the one or more network links or the link-status of the one or more network links by blinking for a predetermined time or for a predetermined number of blinks.

8. The network device of claim 7, wherein the number of blinks is the identifier of the one or more network links, wherein the processing circuitry is configured to cause one or more of the plurality of port-status indicators to indicate the link-status of the one or more network links by blinking for the number of blinks in a predetermined color associated with the link-status or by following the number of blinks by emitting a predetermined color associated with the link-status for a predetermined amount of time.

9. A method of operating a network device, the method comprising:
   configuring, via processing circuitry, a plurality of port-status indicators to represent a port-status of a respective one of a plurality of network ports, wherein each network port of the plurality of network ports facilitates one or more network links between a network device and one or more remote devices;
   receiving, by the processing circuitry, a command to reconfigure one or more of the plurality of port-status indicators; and
   reconfiguring, via the processing circuitry, a first port-status indicator of the plurality of port-status indicators previously configured to represent a port-status of a first network port to represent a link-status of the one or more network links of a second different network port of the network device in response to the command,
   wherein the network device is without dedicated link-status indicators.

10. The method of claim 9, further comprising:
    configuring, via the processing circuitry, a second port-status indicator to indicate an identifier identifying the second port as including the one or more network links that the first port-status indicator is indicating the link-status of in response to the command.

11. The method of claim 10, wherein the command is a first command, the method further comprising:
    reconfiguring, via the processing circuitry, the second port-status indicator of the plurality of port-status indicators previously configured to indicate an identifier identifying the second port to represent a link-status of the one or more network links of the first network port of the plurality of network ports in response to a second command; and
    configuring, via the processing circuitry, the first port-status indicator of the plurality of port-status indicators to indicate an identifier identifying the first port as including the one or more network links that the second port-status indicator is indicating the link-status of in response to the second command.

12. The method of claim 9, wherein the command is received from a user via an interface.

13. The method of claim 9, wherein the plurality of port-status indicators are light emitting diodes (LEDs).

14. The method of claim 13, wherein each LED of the plurality of port-status indicators is configured to indicate the status of the at least one network port or the link-status of the one or more network links by emitting a predetermined color associated with a status.

15. The method of claim 9, wherein the processing circuitry is configured to cause one or more of the plurality of port-status indicators to indicate at least one of an identifier of the one or more network links or the link-status of the one or more network links by blinking for a predetermined time or for a predetermined number of blinks.

16. The method of claim 15, further comprising
configuring, via the processing circuitry, one or more of the plurality of port-status indicators to indicate the identity of the one or more network links by blinking a predetermined number of times; and
configuring, via the processing circuitry, one or more of the plurality of port-status indicators to indicate the link-status of the one or more network links by blinking for the number of blinks in a predetermined color associated with the link-status or by following the number of blinks by emitting a predetermined color associated with the link-status for a predetermined amount of time.

\* \* \* \* \*